(No Model.)
A. L. CLARKE.
CAR FENDER.
No. 508,565. Patented Nov. 14, 1893.
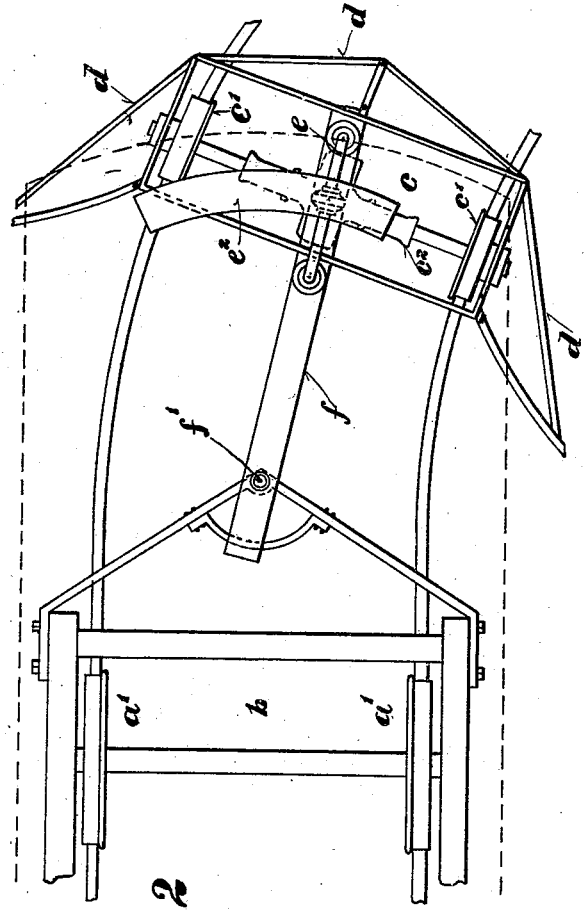
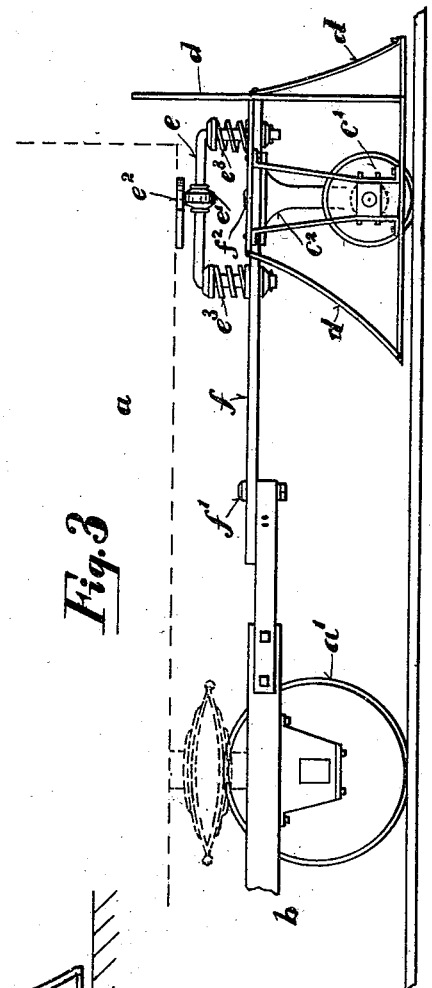
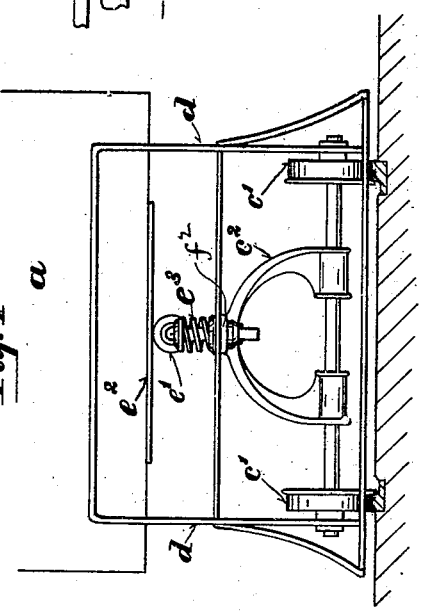
WITNESSES:
Fred Ernest
Frank Watt
INVENTOR
Alfred L. Clarke
BY
ATTORNEYS

UNITED STATES PATENT OFFICE.

ALFRED L. CLARKE, OF SPRINGFIELD, OHIO.

CAR-FENDER.

SPECIFICATION forming part of Letters Patent No. 508,565, dated November 14, 1893.

Application filed May 5, 1893. Serial No. 473,089. (No model.)

*To all whom it may concern:*

Be it known that I, ALFRED L. CLARKE, a citizen of the United States, residing at Springfield, in the county of Clark and State of Ohio, have invented a certain new and useful Improvement in Car-Fenders, of which the following is a specification.

My invention relates to improvements in fenders for cars; the constructions being especially adapted for use with cars such as are employed on street railways, in which the ends of the car extend a considerable distance in front or rear of the supporting trucks.

The object of my invention is to provide a fender which shall remain at all times in proximity to the tracks over which the car runs and follow the direction thereof, no matter what position the body of the car may assume. I attain these objects by the constructions shown in the accompanying drawings, in which—

Figure 1 is an end elevation of a device embodying my invention. Fig. 2 is a plan, and Fig. 3 is a side elevation of the same.

Like parts are represented by similar letters of reference in the several views.

In applying fenders to cars, especially to such as are used on street railways, the difficulty has been to place fenders in such a position as to guard the wheels and at the same time to guard the front of the car as well. If placed on the trucks in front of the wheels, the fronts of the cars are left entirely unprotected, as in most cases the car bodies extend so far in front and rear of the trucks that the fenders attached to the trucks offer no protection to the front of the car. If placed on the body of the car, the fenders in many cases offer no protection to the wheels in passing around curves and in similar places, owing to the fact that the body of the car would not closely follow the direction of the track under such circumstances. In addition to this the vertical movement of the body of the car, caused by the action of the trucks which support the same on the tracks, makes it impracticable to place the fenders near the rails, and renders fenders placed on the body of the car of little practical value, by reason of the vertical vibration which elevates and depresses said fenders. To overcome these difficulties I have provided a fender which is supported on a separate and independent fender truck or wheel frame, placed at or near the front or body of the car but independent thereof; said wheel frame or truck being pivoted to the main truck of the car so as to follow the track at all times, and thus protect the wheels at the same time, carrying the fender at a uniform height above the rails and at a uniform position in front of the car body, so as to protect that as well.

In the drawings $a$, represents an ordinary car body.

$b$, is the main truck, provided in the usual way with supporting wheels $a'$ $a'$.

$c$, is my improved fender, which consists essentially of rods or braces $d$, formed in the nature of a frame extending in front and backwardly at each side of supporting wheels $c'$, $c'$, to which the fender is connected by a suitable frame $c^2$. Arranged above the fender frame is a U-shaped supporting bar $e$, which carries near its center a supporting wheel or roller $e'$, adapted to contact with a curved track $e^2$, arranged on the bottom of the car body. This U-shaped bar $e$, is provided with springs $e^3$, $e^3$, which rest against the fender frame and support said U-shaped piece yieldingly therefrom. This frame, $e$, is connected with a backwardly extending bar $f$, which is pivoted at $f'$, to the main truck $b$, and at $f^2$, to the frame $c^2$.

In assembling the parts, the fender truck is placed under the front end of the car; the body of the car being elevated so as to place the spring supported yoke under the car, with the supporting springs under a sufficient tension to take up all of the vertical movement of the car in operation. The result of this construction will be that the fender and the fender truck will follow the track at all times and at the same time protect the front end of the car. The fender being supported directly from the track will follow the track in a uniform height at all times; the vertical vibrations of the car in nowise interfering with the position of the fender. The addition of the spring pressed yoke with the supporting roller and the curved track, prevents the fender from rising at any time, and at the same time permits the fender to readily adjust itself to different positions with reference to the car body in changing direction, in passing curves, &c.

Said spring pressed yoke will also assist materially in freeing the car from the vertical vibrations which frequently occur to a marked degree in street cars having short trucks and long bodies, such as are now in general use.

It is obvious that the constructions herein described admit of various modifications, and it is not my intention to limit my invention to these exact constructions.

I have illustrated a simple form of fender frame of bars, but the frame may be modified as desired. These bars would preferably be covered with suitable netting, or otherwise protected, but the special form of fender may be varied in any desired shape, so as to accomplish the result without departing from the spirit of my invention.

Having thus described my invention, I claim—

1. A fender for railway cars, consisting essentially of a fender frame supported on suitable flanged wheels, which wheels are adapted to rest on and follow the track on which the car runs, a connecting bar from said fender frame to the main car supporting frame or truck, said connecting bar being at one end pivotally connected to said fender frame and at the other to said car frame or truck, substantially as specified.

2. A fender for railway cars, consisting essentially of a fender frame, a wheel frame on which said fender frame is supported, wheels on said wheel frame to follow the track on which the car is adapted to move, a yielding support arranged above said wheel frame and adapted to bear against the body of the car and move thereon, and a pivotal connection from said fender frame to the main body of the car, substantially as specified.

3. The combination with a car and the body thereof, of a wheeled fender, the supporting wheels of which are adapted to follow the track over which the car passes, a yielding wheeled support arranged above said wheel frame and adapted to bear against the body of the car, and a pivotal connection from said wheeled fender to the main body of the car, substantially as and for the purpose specified.

ALFRED L. CLARKE.

In presence of—
 ROBERT C. RODGERS,
 FRANK WATT.